(12) United States Patent
Sharma et al.

(10) Patent No.: US 9,557,969 B2
(45) Date of Patent: Jan. 31, 2017

(54) AUTOMATED BLUEPRINT ASSEMBLY FOR ASSEMBLING AN APPLICATION

(71) Applicant: BMC Software, Inc., Houston, TX (US)

(72) Inventors: Abhijit Sharma, Pune (IN); Neeran Karnik, Pune (IN); Abhay Ghaisas, Pune (IN)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 14/568,928

(22) Filed: Dec. 12, 2014

(65) Prior Publication Data

US 2015/0169298 A1    Jun. 18, 2015

Related U.S. Application Data

(63) Continuation of application No. 13/433,162, filed on Mar. 28, 2012, now Pat. No. 8,914,768.

(51) Int. Cl.
*G06F 9/44* (2006.01)
*G06F 9/445* (2006.01)

(52) U.S. Cl.
CPC .. *G06F 8/35* (2013.01); *G06F 8/61* (2013.01)

(58) Field of Classification Search
CPC ..................................... G06F 8/35; G06F 8/61
USPC .......................................................... 717/104
See application file for complete search history.

(56) References Cited

U.S. PATENT DOCUMENTS

| 2003/0221184 A1* | 11/2003 | Gunjal | G06F 8/24 717/118 |
| 2004/0268296 A1* | 12/2004 | Kayam | G06F 8/30 717/104 |
| 2006/0037000 A1* | 2/2006 | Speeter | H04L 67/10 717/120 |
| 2007/0174810 A1 | 7/2007 | Hockenberry et al. | |

(Continued)

FOREIGN PATENT DOCUMENTS

| WO | 2013/148651 A2 | 10/2013 |
| WO | 2013/148651 A3 | 1/2014 |

OTHER PUBLICATIONS

Extended European Search Report for European Application No. 13716588.2, mailed Nov. 11, 2015, 9 pages.

(Continued)

*Primary Examiner* — Viva Miller
(74) *Attorney, Agent, or Firm* — Brake Hughes Bellermann LLP

(57) ABSTRACT

The embodiments provide a data processing apparatus for automated blueprint assembly. The data processing apparatus includes a micro-blueprint assembler configured to receive a request for automated blueprint assembly for assembling an application, where the request specifies at least one feature, and a model database configured to store model data. The model data includes a plurality of classes and class properties. The data processing apparatus further includes a micro-blueprint database configured to store a plurality of micro-blueprints. Each micro-blueprint corresponds to a functional component of a stack element or service tier, and the functional component is annotated with one or more classes of the plurality of classes and at least one required capability and available capability. The micro-blueprint assembler is configured to generate at least one (Continued)

application blueprint based on the model data and the plurality of micro-blueprints according to the request.

19 Claims, 7 Drawing Sheets

(56) References Cited

U.S. PATENT DOCUMENTS

| | | |
|---|---|---|
| 2009/0249374 A1 | 10/2009 | Hepper et al. |
| 2010/0031247 A1 | 2/2010 | Arnold et al. |
| 2011/0055801 A1 | 3/2011 | von Unwerth et al. |
| 2011/0088011 A1 | 4/2011 | Ouali |
| 2011/0321033 A1* | 12/2011 | Kelkar ............... G06F 9/44505 |
| | | 717/174 |
| 2013/0263080 A1 | 10/2013 | Karnik et al. |

OTHER PUBLICATIONS

International Search Report and Written Opinion received for PCT Patent Application No. PCT/US2013/033839, mailed on Nov. 12, 2013, 17 pages.
International Preliminary Report on Patentability received for PCT Patent Application No. PCT/US2013/033839, mailed on Oct. 9, 2014, 9 pages.
Non-Final Office Action received for U.S. Appl. No. 13/433,162, mailed on Feb. 3, 2014, 20 pages.
Response to Non-Final Office Action for U.S. Appl. No. 13/433,162, filed on Jun. 3, 2014, 13 pages.
Notice of Allowance received for U.S. Appl. No. 13/433,162, mailed on Aug. 14, 2014, 10 pages.

* cited by examiner

AUTOMATED BLUEPRINT ASSEMBLY FOR ASSEMBLING AN APPLICATION

CROSS REFERENCE TO RELATED APPLICATION

This application claims priority to, and is a continuation of, U.S. Non-provisional patent application Ser. No. 13/433,162, filed on Mar. 28, 2012, entitled "AUTOMATED BLUEPRINT ASSEMBLY FOR ASSEMBLING AN APPLICATION", the disclosure of which is incorporated by reference herein in its entirety.

TECHNICAL FIELD

The present disclosure relates generally to automated blueprint assembly.

BACKGROUND

A functional blueprint of an application may define the topology (e.g., the number of tiers), configuration, actions, constraints, operating systems, and software packages that need to be provisioned to deploy an application or server. A deployment blueprint for each functional blueprint defines a way (amongst many) in which the application could be provisioned in terms of mapping to resource sets and the required compute, storage, network. For example, a "QA" deployment blueprint may use a single resource set with one virtual machine (VM) to host all three tiers of application, whereas a "Production" deployment blueprint may distribute the three individual application tiers to three different resource sets.

Currently, there exist a number of different conventional methods to generate functional blueprints or deployment blueprints. However, the conventional methods provide a blueprint that is monolithic in design, for example, an application template that includes the definition of all the functional components and their respective software stacks in situ. As a result, the conventional blueprint may be unsuitable for extensive re-use. For example, there may be a number of different choices of software stack elements in a software stack. With the current monolithic design, this would mean creating multiple functional blueprints for all the different options. The sheer choice of re-usable services, similar conformant infrastructure, software stack elements, and/or versions may lead to an explosion in the number of complete blueprints to be defined and maintained in a catalog. As a result, managing the conventional blueprints may be unworkable, or cumbersome at best.

SUMMARY

The embodiments provide a data processing apparatus for automated blueprint assembly. The data processing apparatus includes a micro-blueprint assembler configured to receive a request for automated blueprint assembly for assembling an application, where the request specifies at least one feature, and a model database configured to store model data. The model data includes a plurality of classes arranged in a hierarchy with relational information and the model data includes class properties for at least a portion of the plurality of classes. The data processing apparatus further includes a micro-blueprint database configured to store a plurality of micro-blueprints. Each micro-blueprint corresponds to a functional component of a stack element or service tier, and the functional component is annotated with one or more classes of the plurality of classes and at least one required capability and available capability. The micro-blueprint assembler is configured to generate at least one application blueprint based on the model data and the plurality of micro-blueprints according to the request.

In one embodiment, the request also specifies at least one constraint and environment. Also, the at least one feature may be a non-functional feature. The plurality of classes may represent different levels of the stack elements and the relational information may define relations between the plurality of classes.

The plurality of classes may include core abstract classes including at least one of an application, deployment, application server, platform runtime, operating system and database server, and each of the core abstract classes may include sub-classes corresponding to the micro-blueprints for the stack elements.

The micro-blueprint assembler is configured to generate the at least one application blueprint may include assembling a subset of the plurality of micro-blueprints for each service tier and each stack element within each service tier according to the request.

The micro-blueprint assembler may include an application blueprint assembler configured to assemble micro-blueprints corresponding to service tiers of the application, and a functional component blueprint assembler configured to assemble micro-blueprints corresponding to stack elements for each of the service tiers.

The application blueprint assembler is configured to assemble the micro-blueprints may include obtaining micro-blueprints corresponding to the service tiers from the micro-blueprint database according to the request and the required capabilities and the available capabilities of the plurality of micro-blueprints.

The functional component blueprint assembler is configured to assemble the micro-blueprints may include obtaining micro-blueprints corresponding to the stack elements for each of the service tiers according to the request and the relational information.

The application blueprint assembler is configured to assemble the micro-blueprints may include obtaining micro-blueprints corresponding to the service tiers from the micro-blueprint database using an artificial intelligence (AI) search algorithm.

The micro-blueprint assembler may be configured to generate a list of application blueprints in an order of suitability that achieves the request.

The embodiments also provide a method for automated blueprint assembly. The method includes receiving a request for automated blueprint assembly for assembling an application, where the request specifies at least one feature, and generating at least one application blueprint based on model data and a plurality of micro-blueprints according to the request. The model data includes a plurality of classes arranged in a hierarchy with relational information and the model data includes class properties for at least a portion of the plurality of classes. Each micro-blueprint of the plurality of micro-blueprints corresponds to a functional component of a stack element or service tier, and the functional component is annotated with one or more classes of the plurality of classes and at least one required capability and available capability.

In one embodiment, the request also specifies at least one constraint and environment. Also, the at least one feature may be a non-functional feature. The plurality of classes may represent different levels of stack elements and the relational information define relations between the plurality of classes.

The plurality of classes may include core abstract classes including at least one of an application, deployment, application server, platform runtime, operating system and database server, and each of the core abstract classes may include sub-classes corresponding to the micro-blueprints for the stack elements.

The generating the at least one application blueprint may include assembling a subset of the plurality of micro-blueprints for each service tier and each stack element within each service tier according to the request. The generating the at least one application blueprint may include assembling micro-blueprints corresponding to service tiers of the application and assembling micro-blueprints corresponding to stack elements for each of the service tiers.

The embodiments also provide a non-transitory computer-readable medium storing instructions that when executed cause one or more processors to perform a process. The instructions comprising instructions to receive a request for automated blueprint assembly for assembling an application, where the request specifies at least one feature, and generate at least one application blueprint based on model data and a plurality of micro-blueprints according to the request. The model data includes a plurality of classes arranged in a hierarchy with relational information, and the model data includes class properties for at least a portion of the plurality of classes. Each micro-blueprint of the plurality of micro-blueprints corresponds to a functional component of a stack element or service tier, and the functional component is annotated with one or more classes of the plurality of classes and at least one required capability and available capability.

DESCRIPTION OF EXAMPLE EMBODIMENTS

Figure 1:
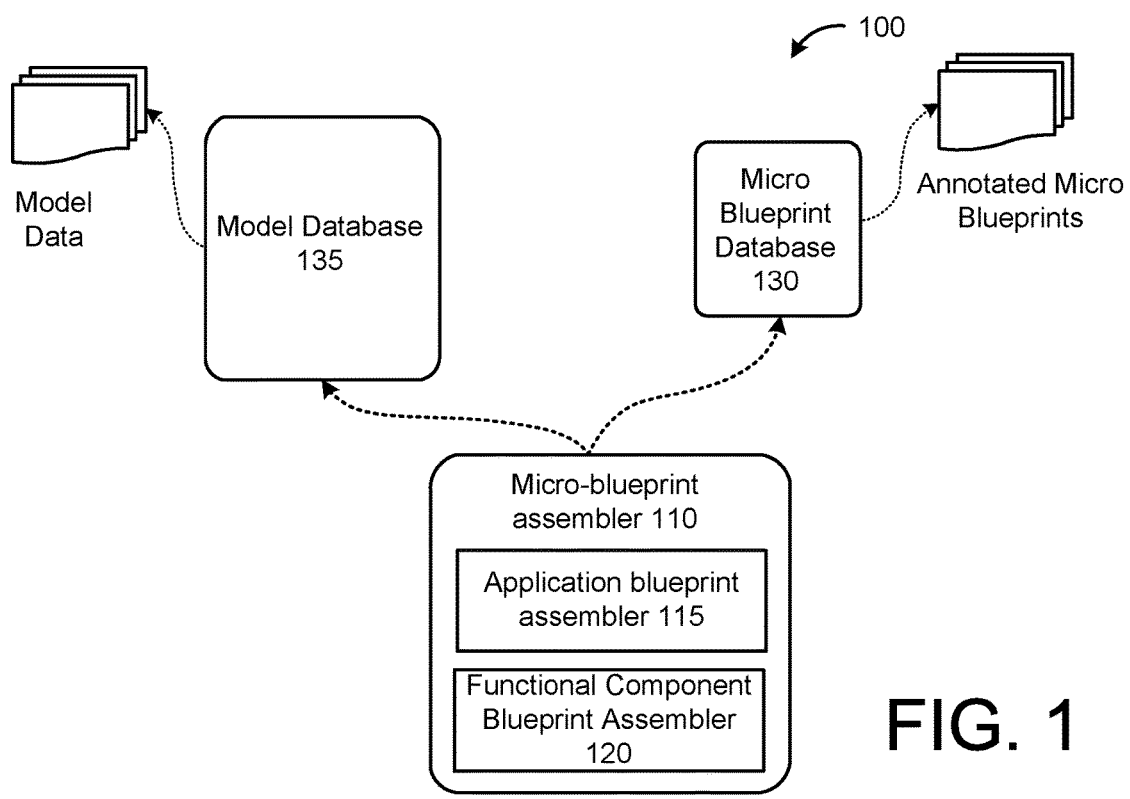
FIG. 1 illustrates a data processing apparatus for automated blueprint assembly according to an embodiment.

FIG. 1 illustrates a data processing apparatus 100 for automated blueprint assembly according to an embodiment. The data processing apparatus 100 may include a micro-blueprint assembler 110, a model database 135 that stores model data, and a micro blueprint database 130 that stores micro-blueprints annotated with information from the model data.

Micro-blueprints may include software stack elements and/or service tiers. For example, each micro-blueprint may correspond to a functional component of a software stack element (e.g., Java Oracle JRE 1.6) or a service tier (e.g., web tier, application tier, or database tier). The micro-blueprints for the service tier may refer to the more general functional components of an application—web tier, application tier and database tier, for example. The micro-blueprints for the software stack elements may refer to the more specific functional components of each service tier. For example, with respect to the software stack elements, the micro-blueprints may include the software stack elements for each service tier of the application. In one embodiment, the micro-blueprints may be re-usable and compose-able blueprints for the software stack elements such as Java Runtime Environment (JRE) or application server Oracle WebLogic 11.5g and for the service tiers such as "PetStore App-Tier Services," for example. According to the embodiments, these micro-blueprints can be combined together to assemble a complete application or functional component blueprint.

In general, a blueprint may represent re-usable canonical application templates which represent different application views. These are typically stored in a repository and made available, as part of a catalog, for users to select from for various purposes like developing an application, for example. Enterprise and application architects in collaboration with middleware, database, and operating system administrators may define these blueprints based on enterprise architecture standards, reference architectures, security standards, stable version, standards compliance, and/or performance characteristics, for example. In other words, a blueprint may be a declarative specification of different aspects or views of an application or service such as the architecture view and the deployment view. They are used for enabling various key application related cloud services and other use cases. In one application, users may use the blueprints to provision applications in a cloud environment. Generally, the blueprint encompasses two types of blueprints—functional blueprints and deployment blueprints. A functional blueprint may define the architectural view or the structure of an application/service in terms of its tiers (also referred to as functional components) and the connection between the components. Also, the functional blueprint may define the software stack elements and related artifacts (e.g., startup, install scripts) within each functional component. A deployment blueprint may define the deployment view or intent for an application in terms of resource requirements (e.g., compute, storage, and network) for deploying its various functional components. Multiple deployment blueprints may conform to a functional blueprint of an application. The multiple deployment blueprints may include a QA deployment blueprint where all three functional components (e.g., web tier, application tier and database tier) are deployed on a single virtual machine (VM) with certain CPU and memory resources, where a Production deployment blue-print may deploy each of the three functional components in three individual VMs. The multiple deployment blueprints may encompass many other variations other than the QA deployment blueprint and Production deployment blueprint.

As further explained below, the data processing apparatus 100 decomposes the blueprint into compose-able and re-usable micro-blueprints, and the micro blueprints are annotated with one or more classes from the model data in the model database 135. Essentially, the annotated micro-blueprints map the micro-blueprints of the service or software stacks to one or more classes of the model data, where the model data also includes relational information defining relations among the classes. Using the annotated micro-blueprints and the model data, the data processing apparatus 100 automatically assembles the complete composed blueprint on the fly from the micro-blueprints so that the application can be provisioned or developed. In other words, the data processing apparatus 100 uses a model driven approach for flexible, dynamic and automated, complete blueprint composition from smaller building blocks such as the micro-blueprints. The complete application blueprint may encompass the functional blueprint or the deployment blueprint described above. This completely assembled blueprint can be used to develop the entire application including its components or tiers, and their respective software stack elements.

According to one embodiment, the micro-blueprint assembler 110 may receive a request for automated blueprint assembly for developing an application. The request may specify features, constraints, or one or more environments for assembling the application. The request may specify functional (e.g., features, services) and/or non-functional aspects (e.g., security, scalability) of assembling the application. The request may be fairly high level or granular depending on the user's requirements. For example, a request may specify a need for a particular type of application (e.g., a PetStore application) regardless of the software stack. In response, the micro-blueprint assembler 110 may generate a .NET based PetStore blueprint or a Tomcat based PetStore blueprint. In another example, the request may specify a J2EE compliant PetStore blueprint. In response, the micro-blueprint assembler 110 may generate a J2EE compliant blueprint. In one embodiment, the features may correspond to the classes of the model data, and the constraint and the environment aspects may correspond to the class properties of the classes, as further explained below.

Generally, in response to the request, the micro-blueprint assembler 110 may query the model classes and its class properties from the model data of the model database 135. The model data may be considered a semantically rich and extensible model which captures domain knowledge in the form of key classes in the domain, class hierarchy, class properties and relationships between classes, facets or restrictions on properties or relations such as allowed values, and/or cardinality, for example. In addition, the model data also captures one or more rules related to the classes and the class properties. According to the embodiments, the model data may capture the domain knowledge related to popular applications, components, and software elements, standard application services, servers, and/or middleware, for example. The key abstract classes may be Operating System, Platform Runtimes, Application Servers, and/or Deployment, for example. In one embodiment, the model data may include a plurality of classes arranged in a hierarchy with relational information. Further, the model data may include class properties for one or more of the classes. Essentially, the plurality of classes may represent different levels of stack elements and the relational information may define relations between the plurality of classes. The model data is further explained with reference to FIG. 3.

The micro-blueprints stored in the micro-blueprint database 130 may be annotated with relevant key classes from the model data to enable automated composition. For example, an Oracle Java JRE micro-blueprint may be annotated with "OracleJRE" class from the model. This aspect is further described with reference to FIG. 5. As such, when the micro-blueprint assembler 110 receives a request that specifies a feature of a certain type of application, the micro-blueprint assembler 110 may query the appropriate class from the model data of the model database 135, and then query the micro-blueprints having the obtained one or more classes from the micro-blueprint database 130. Further, the micro-blueprints may be annotated with capabilities and required capabilities, as further described with reference to FIGS. 4 and 6.

The micro blueprint assembler 110 may encompass a flexible approach that may leverage the model data, the annotated re-usable micro-blueprints to automate assembly of a complete application blueprint that can then be used to develop the entire application including its service tiers, and the software stack elements for each service tier. In other words, a semantically rich abstract model and annotated micro-blueprints enable automated composition of the complete application blueprint composed at runtime based on the application request.

The micro blueprint assembler 110 may include an application blueprint assembler 115, and a functional component blueprint assembler 120. In other words, according to one embodiment, the process may be separated into two parts—the application blueprint assembler 115 and the functional component blueprint assembler 120. The application blueprint assembler 115 may assemble the micro-blueprints from the micro-blueprint database 130 corresponding to service tiers (e.g., web tier, application tier, and database tier). The assembly of the micro-blueprints for the service tiers is further explained with reference to FIG. 7. Going a level deeper, the functional component blueprint assembler 120 may assemble the micro-blueprints from the micro-blueprint database 130 corresponding to the stack elements for each of the service tiers. The assembly of the micro-blueprints for the stack elements for each of the service tiers is explained with reference to FIG. 8. Also, if the micro-blueprint database 130 includes a relatively large number of micro-blueprints, the application component assembler 115 may use an artificial intelligence (AI) search algorithm for locating the appropriate micro-blueprints.

Figure 2:
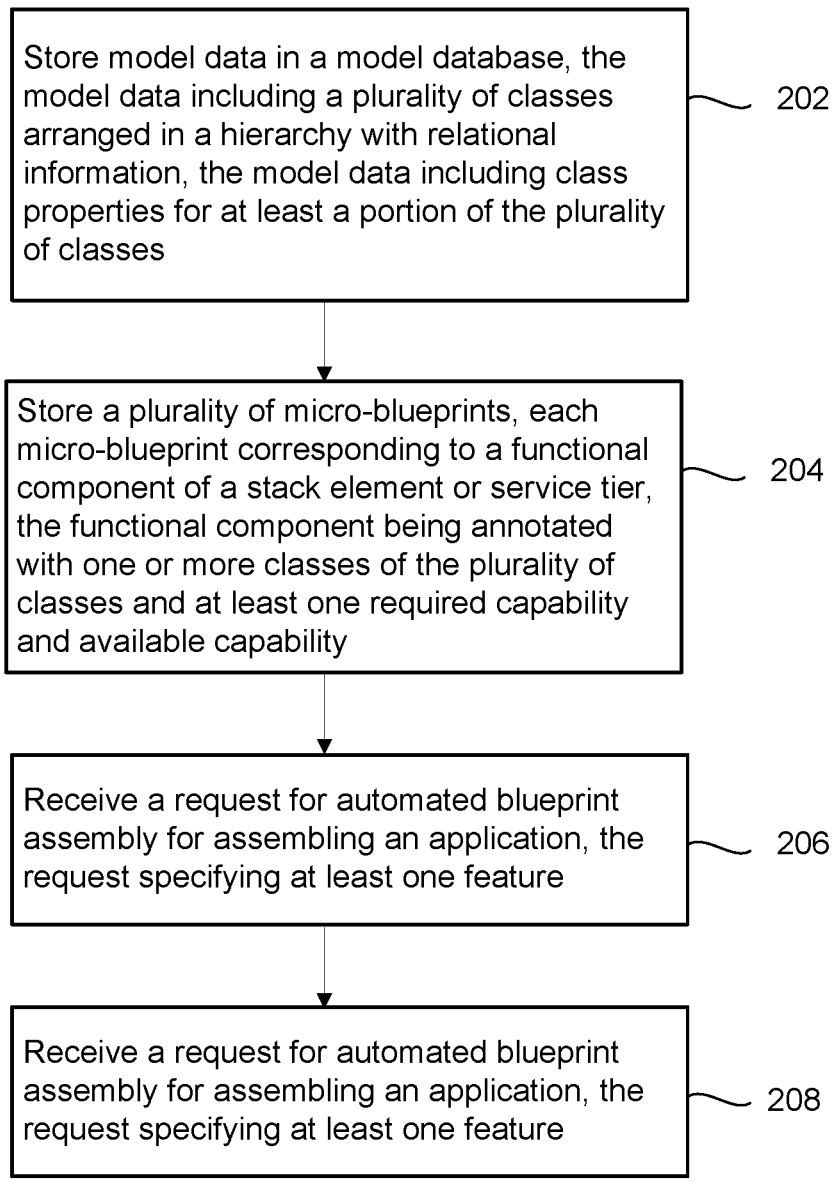
FIG. 2 is a flowchart illustrating example operations of the data processing apparatus of FIG. 1 according to an embodiment.

FIG. 2 is a flowchart illustrating example operations of the data processing apparatus 100 of FIG. 1. Although FIG. 2 is illustrated as a sequential, ordered listing of operations, it will be appreciated that some or all of the operations may occur in a different order, or in parallel, or iteratively, or may overlap in time.

Model data may be stored in a model database (202). According to the embodiments, the model database 135 may store the model data. The model data may capture the domain knowledge related to popular applications, components, and software elements, standard application services, servers, and/or middleware, for example. The key abstract classes may be Operating System, Platform Runtimes, Application Servers, and/or Deployment, for example. In one embodiment, the model data may include a plurality of classes arranged in a hierarchy with relational information. Further, the model data may include class properties for one or more of the classes. Essentially, the plurality of classes may represent different levels of the stack elements and the relational information may define relations between the plurality of classes.

A plurality of annotated micro-blueprints may be stored in a micro-blueprint database (204). For example, the micro-blueprint database 130 may store the plurality of annotated micro-blueprints. Each micro-blueprint may correspond to a functional component of a stack element or service tier, where the functional component is annotated with one or more classes of the plurality of classes and at least one required capabilities and available capabilities.

A request for automated blueprint assembly for assembling an application may be received (206). For example, the micro-blueprint assembler 110 may receive the request for automated blueprint assembly for assembling an application. The request may specify at least one feature (functional or non-functional). Optionally, the request may specify one or more constraints or environments for assembling the application. In other words, the request may specify functional (e.g., features, services) and/or non-functional aspects (e.g., security, scalability). The request can be fairly high level or granular depending on the user's requirements.

At least one complete application blueprint may be generated based on the model data and the plurality of micro-blueprints according to the request (208). For example, the micro-blueprint assembler 110 may generate one or more of the application blueprints having at least one feature, constraint or environment based on the model data and the plurality of micro-blueprints in response to the request. For example, the micro blueprint assembler 110 may assemble a subset of the plurality of micro-blueprints from the micro-blueprint database 130 for each service tier and for each stack element within each service tier according to the request (e.g., the features, constraints, and/or the environment). Initially, the application blueprint assembler 115 may assemble the micro-blueprints according to the service tiers of the application. In one embodiment, the application blueprint assembler 115 may obtain the micro-blueprints corresponding to the service tiers according to the request (e.g., the features, constraints, and/or environment) as well as the required capabilities and the available capabilities of the plurality of micro-blueprints in the micro-blueprint database 130. In addition, if the plurality of micro-blueprints stored in the micro-blueprint database 130 is relatively large, the application blueprint assembler 115 may use an AI search algorithm in order to obtain the micro-blueprints in the micro-blueprint database 130. Subsequently, the functional component blueprint assembler 120 may assemble the micro-blueprints corresponding to the stack elements for each of the service tiers. For instance, the functional component blueprint assembler 120 may obtain the micro-blueprints corresponding to the stack elements for each of the service tiers according to the request and the relational information of the model data of the model database 135.

Figure 3:
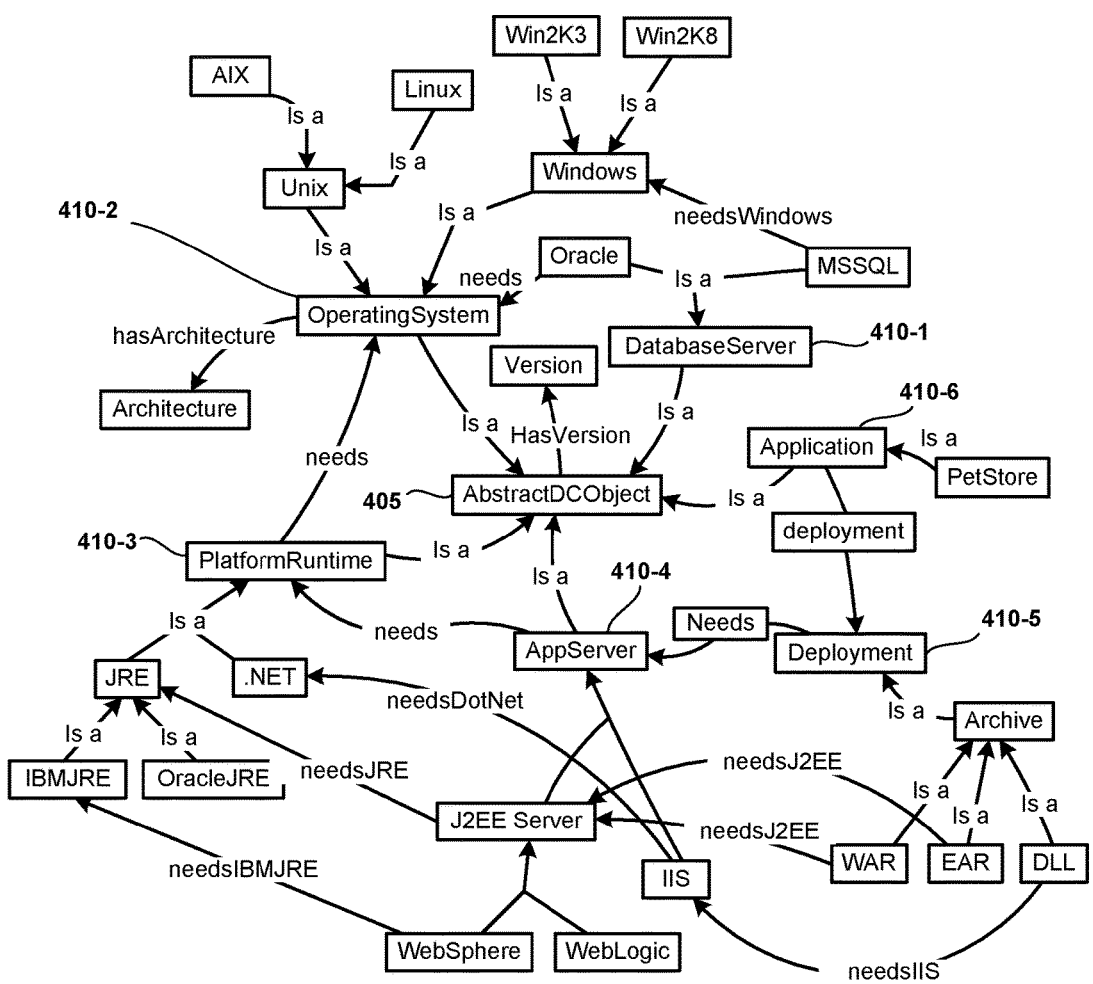
FIG. 3 illustrates model data of a model database of FIG. 1 according to an embodiment.

FIG. 3 illustrates the model data 300 of the model database 135 of FIG. 1 according to an embodiment. The model data may include a semantically rich model which captures abstracted domain knowledge relevant to typical application blueprints with a specific focus towards provisioning of those applications. Domain experts (e.g., architects and/or administrators) may create and maintain the model database 135. As indicated above, the model data may capture the domain knowledge related to popular applications, components, software elements, middleware, standard application services, and/or application servers, for example.

The model data 300 may be considered a semantically rich and extensible model which captures domain knowledge in the form of key classes in the domain, class hierarchy, class properties and relationships between classes, facets or restrictions on properties or relations such as allowed values, and/or cardinality, for example. In addition, the model data also captures one or more rules related to the classes and the class properties. Referring to FIG. 3, the model data 300 may include a plurality of classes that are arranged in a hierarchy with relational information. As shown in FIG. 3, and further described below, the plurality of classes may represent different levels of stack elements, and the relational information (e.g., "is a", "needs") may define relations between the plurality of classes.

For example, the model data 300 may include an abstract main object 405 (e.g., AbstractDCObject), and a plurality of core classes 410 that are relevant to typical application stack elements. The plurality of core classes 410 may be considered sub-classes of the abstract main object 405. In one example, the core classes may include a database server 410-1, an operating system 410-2, a platform runtime 410-3, an application server 410-4, a deployment 410-5, and/or an application 410-6. The application 410-6 may represent applications such as a PetStore application or any other type of application. An application 410-6 may include a plurality of deployments represented as deployment 410-5. The deployment 410-5 may represent deployable artifacts such as packages/archives, e.g. Web Archive (WAR), Enterprise Archive (EAR), and/or DLL, which are deployed into application servers to instantiate an application's modules. The deployment sub-classes may be WAR, EAR, and DLL.

The application server 410-4 (e.g., AppServer) may represent an application server where the deployable packages are deployed to instantiate application modules. The J2EEServer and IIS may represent two sub-classes of AppServer and further down the hierarchy WebLogic and WebSphere are sub-classes of J2EEServer. Application servers require a platform runtime for an execution environment, e.g. a J2EEServer requires a Java JRE platform runtime.

The platform runtime 410-3 (e.g., PlatformRuntime) may represent an execution runtime environment such as a JVM for programs like an application server to execute in. JRE and .NET are sub-classes of PlatformRuntime 410-3 and further IBMJRE and OracleJRE are sub-classes of JRE. As shown in FIG. 3, the platform runtime may require an operating system to execute.

The operating system 410-2 (e.g., OperatingSystem) may represent the operating system on which the platform runtime executes. Unix and Windows are sub-classes of OperatingSystem 410-2 and further AIX and Linux are sub-classes of Unix. The database server 410-1 (e.g., DatabaseServer) may represent a database such as Oracle or MSSQL, which in turn requires an operating system 410-2.

One or more of the classes may include class properties, which further describe various properties of the class that could be used in the application request as constrains to filter the software stack elements. In other words, the model data 300 includes class properties for one or more of the classes. For example, the class properties of the operating system 410-2 may include different versions such as 32 bit or 64 bit. As such, the application request may specify that it desires the app tier OS version to be 64 bit. Further, the WebSphere class may include different WebSphere versions such as WebSphere Version 5 or WebSphere version 6.1. As such, the application request may specify that it desires a WebSphere application server with minimum app tier OS version to be 64 bit. Further, the JRE class may include various versions of the JRE class. For example, the JRE class may have JRE version 1.5 or JRE version 1.6.

In addition, the model data 300 may include relational information. For example, the model data includes a plurality of key relations between classes in the domain model. In one example, the key relations may include the needs relation. The needs relation may be defined on the AbstractDCObject 405 and represent a dependency between classes from a software stack perspective. To illustrate, as shown in FIG. 3, a Deployment (e.g. WAR) requires an AppServer (e.g. WebLogic), an AppServer requires a PlatformRuntime (e.g. OracleJRE) and the PlatformRuntime requires an OperatingSystem (e.g. Linux).

Further, the needs relation is further specialized in the sub-classes of AppServer and PlatformRuntime. J2EEServer (which is an AppServer) restricts the needs relation to the PlatformRuntime to the needs JRE relation to the JRE sub-class of PlatformRuntime as J2EE based application servers can only run on the Java Runtime Environment (JRE) and not on .NET. There is further specialization defined for WebSphere uses the needs IBMJRE relation to link to a sub-class of JRE, the IBMJRE as it only runs on IBM JRE environment. These can be considered as facets or constraints on the needs relation.

The needs relation and its specializations or restrictions will be utilized in the process of building a suitable software stack automatically from micro-blueprints of the individual software elements. This is possible because the needs relation represents dependencies between classes for abstract software elements from a software stack perspective.

In addition, the model data 300 may represent non-functional aspects of the application. For example, the non-functional aspects (e.g., security, scalability, high availability) may be represented as classes in the domain model and can be used to annotate the software packages or functional component blueprints. This allows the application request to include non-functional aspects in addition to the functional aspects. For example, a clustered WebLogic app server micro-blueprint may be annotated with classes from the domain representing concepts such as "high availability." This will be selected in preference to a generic WebLogic app server micro-blueprint when the application request indicates a need for high availability.

In essence, the classes (including their properties and relations) associated with the micro-blueprints will be used to dynamically assemble multiple blueprints to achieve a complete blueprint for a software stack for each functional component to deliver a complete blueprint for an application.

Dynamic automated assembly of a complete application blueprint from several such micro-blueprints may require a mechanism for describing their functionality in terms of classes belonging to the model data 300 described earlier, e.g., describing the functionality of the software package or service micro-blueprint. For example, the micro-blueprints are annotated with information from the model data 300 of the model database 135. In particular, the micro-blueprints may be annotated with one or more classes. In addition, each micro-blueprint is annotated with capability information, as further described below with reference to FIG. 4.

Figure 4:
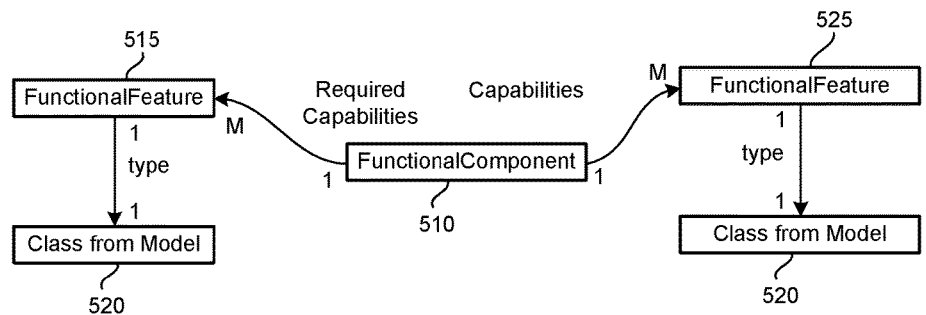
FIG. 4 illustrates an abstract model for annotation of a functional component representing a software stack element or a service according to an embodiment.

FIG. 4 illustrates an abstract model for annotation of a functional component representing a software stack element or a service tier according to an embodiment. For example, as indicated above, each micro-blueprint corresponds to a functional component 510, and the functional component may correspond to a service tier (e.g., web tier, application tier, and database tier) or a software stack element. As such, the functional component 510 may correspond to the function of the software stack element or the function of the service tier. The functional component 510 may include a plurality of required capabilities and a plurality of available capabilities. Each required capability may correspond to a different functional feature 515, which is annotated with one or more classes 520 from the model data 300. Also, each available capability corresponds to a different functional feature 525, which is annotated with one or more classes 520 from the model data 300. In other words, the abstract model may include a functional component 510 that has a plurality of available capabilities which may represent the capabilities of a respective functional component. Further, the functional component 510 may have a plurality of required capabilities which may represent the capabilities of the respective functional component. The capabilities may be considered collections of a functional feature class. The functional feature class may include an attributed type which refers to a class 520 from the model data 300, e.g., an Oracle Java JRE micro-blueprint has a functional component which is annotated with "OracleJRE" class from the model data 300.

Figure 5:
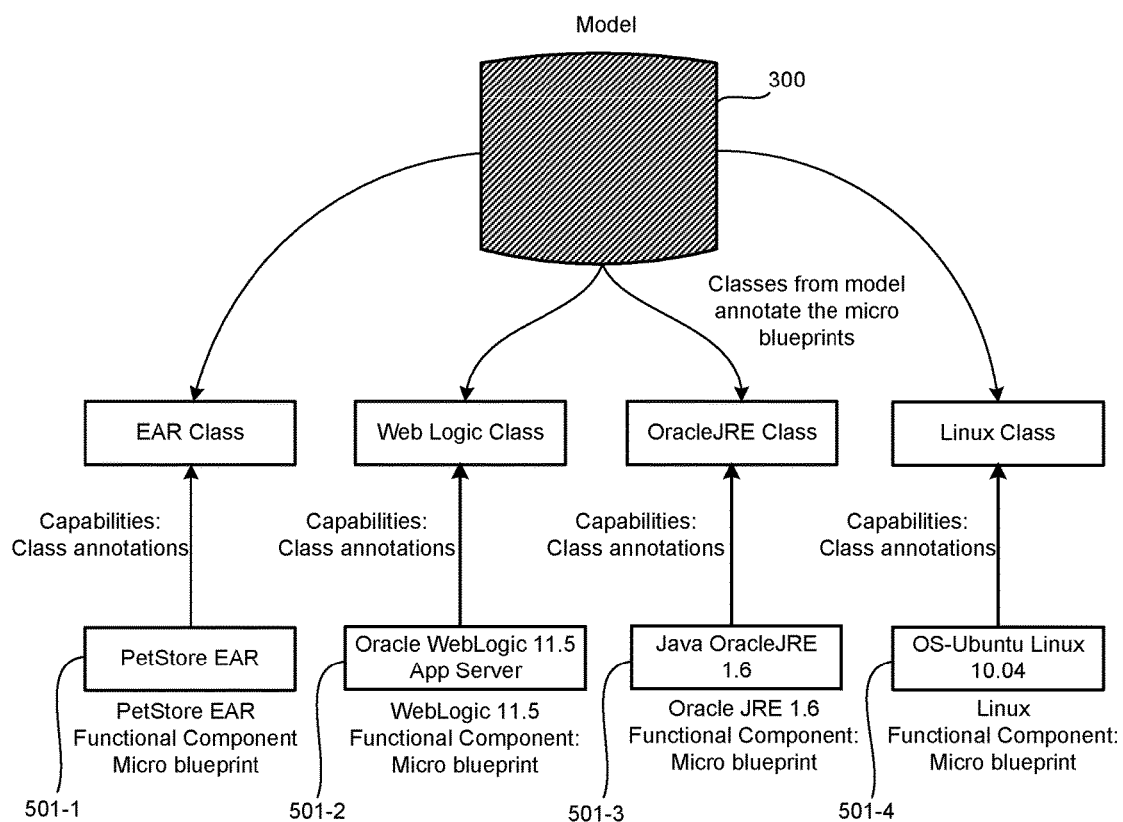
FIG. 5 illustrates a mapping between classes of the model data and the micro-blueprints corresponding to the software stack elements according to an embodiment.

FIG. 5 illustrates a mapping between classes of the model data 300 and the micro-blueprints corresponding to the software stack elements according to an embodiment. For example, as shown in FIG. 5, individual micro-blueprints 501 are annotated with information from the model data 300. For example, the micro-blueprints 501 may include a PetStore EAR micro-blueprint 501-1, an Oracle WebLogic 11.5 app server micro-blueprint 501-2, a Java Oracle JRE 1.6 micro-blueprint 503-3, and an Ubuntu Linux 10.04 micro-blueprint 501-4. These types of micro-blueprints are illustrated for explanatory purposes only, where the embodiments encompass any type of software stack element. The micro-blueprints 501 may be annotated with relevant classes from the model data 300 (e.g., capabilities<FunctionalFeature> type may refer to the relevant class). For example, the Oracle WebLogic 11.5 App Server micro-blueprint 501-2 may be annotated with the WebLogic class (sub-class of J2EEServer→AppServer→AbstractDCObject). Also, the micro blueprints may be annotated with the more generic class or more specific class in the class hierarchy and of course with multiple classes if needed.

Figure 6:
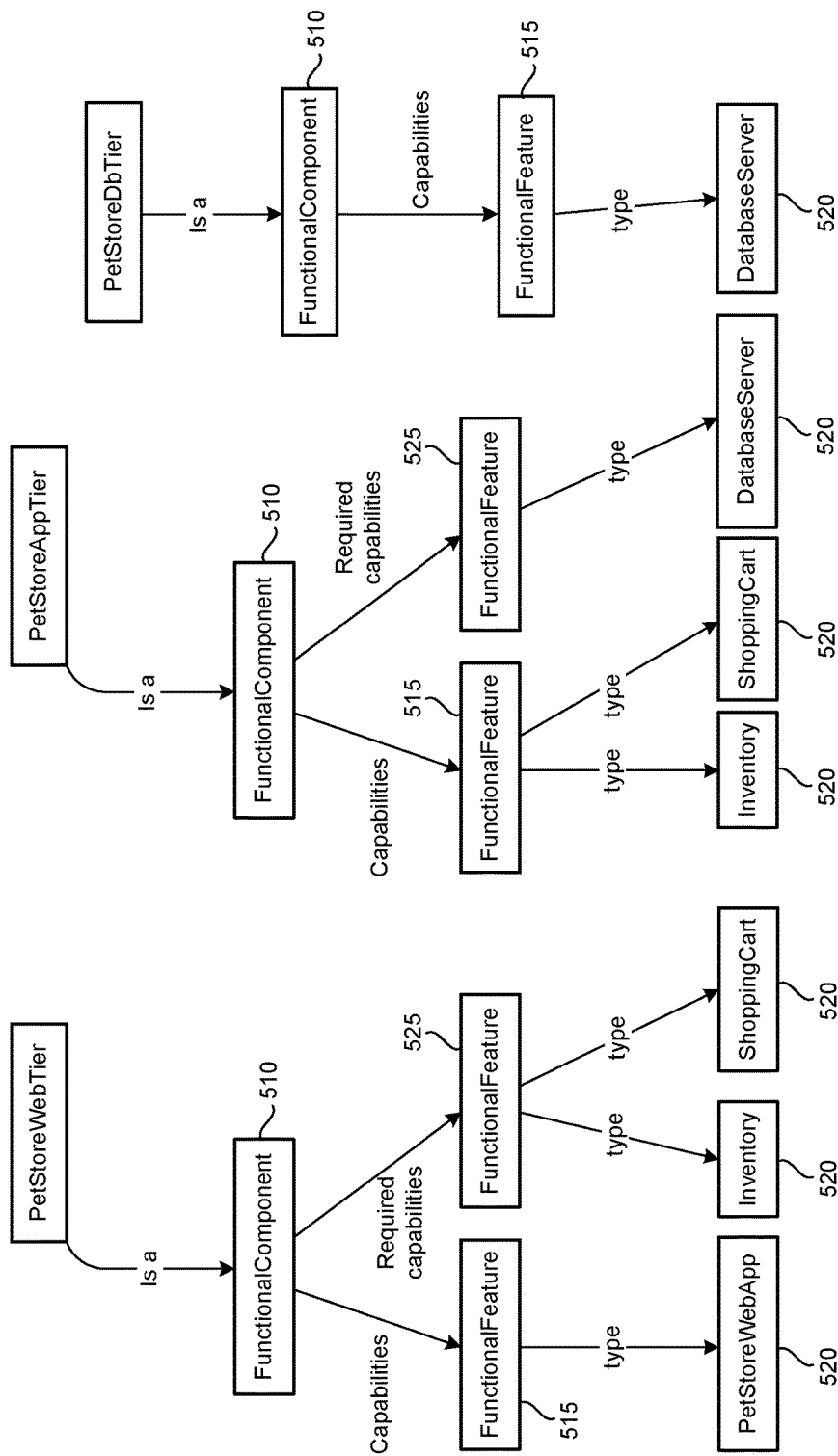
FIG. 6 illustrates example micro-blueprints and their class annotations corresponding to a plurality of service tiers according to an embodiment.

FIG. 6 illustrates the micro-blueprints and their class annotations corresponding to the service tiers according to an embodiment. Although FIG. 6 illustrates the example of a PetStore application, the embodiments encompass any type of application having any number of service tiers. FIG. 6 illustrates three different micro-blueprints for the web tier, the application tier, and the database tier. Each micro-blueprint corresponds to a functional component 510 and includes functional features 515 and required functional features 525. Further, the functional features 515 and the required functional features 525 are annotated with class information from the model data 300. For example, the PetStore Web Tier has capabilities 'PetStoreWebApp' and requires capabilities of 'Inventory' and 'ShoppingCart' for it to be functional. The PetStore App Tier has capabilities 'Inventory' and 'ShoppingCart' and requires capabilities of a 'DatabaseServer.'

In one embodiment, the application blueprint assembler 115 may assembly the micro-blueprints for the service tiers based on a matching of required and available capabilities, which allows automatically assembly of the PetStore Web Tier, the PetStore App Tier and the PetStore DB Tier micro-blueprints into the fully fledged PetStore Application blueprint. Going one level deeper, within a functional component like PetStore App Tier, the functional component blueprint assembler 120 may assemble the micro-blueprints for the complete software stack from the annotated micro-blueprints in the database 130, as further explained below.

As indicated above, the micro blueprint assembler 110 may receive a request to generate a complete application blueprint. For example, the application request may specify at least one feature, as well as various constraints or environments. The output of processing an application request may be a list of dynamically composed application blueprints ranked in order of suitability. In one embodiment, the application request may specify a certain aspect such as a desired functional aspect (e.g., features, services required) and/or non-functional aspects (e.g., security, scalability, high availability) represented as classes from the model data 300. For example, a request for a highly available PetStore application will expect in response a composed blueprint for the PetStore application, with the app tier functional component software stack including clustered WebLogic (or Tomcat) app server. In addition, it may also include a functional component for a software load balancer to load balance HTTP requests to the application server instances.

Also, the request may specify one or more constraints. The constraints may relate to the constraint on the classes in the form on conditions on their properties/relations which filter the options available in terms of micro-blueprints to be used during composition. For example, the request may specify a constraint such as a J2EE compliant stack with minimum J2EE conformance level of 1.5.

Also, the request may specify an environment. The environment specified has an impact on the chosen components or software stack elements. For example, in the DEV environment, Tomcat application server may be selected, whereas in the PROD environment, the clustered WebLogic app server may be selected.

Based on the information contained in the request, the micro blueprint assembler 110 is configured to generate one or more complete application blueprints from the re-usable micro-blueprints. For example, the micro blueprint assembler 110 may assemble a subset of the plurality of micro-blueprints from the micro-blueprint database 130 for each service tier and for each stack element within each service tier according to the request. Initially, the application blueprint assembler 115 may assemble the micro-blueprints according to the service tiers of the application. In one embodiment, the application blueprint assembler 115 may obtain the micro-blueprints corresponding to the service tiers according to the request and the required capabilities and the available capabilities of the plurality of micro-blueprints in the micro-blueprint database 130. The details of compositing the service level micro-blueprints are further explained with reference to FIG. 7. In addition, if the plurality of micro-blueprints stored in the micro-blueprint database 130 is relatively large, the application blueprint assembler 115 may use an AI search algorithm, which is further explained below.

Subsequently, the functional component blueprint assembler 120 may assemble the micro-blueprints corresponding to the stack elements for each of the service tiers. For instance, the functional component blueprint assembler 120 may obtain the micro-blueprints corresponding to the stack elements for each of the service tiers according to the request. The assembly for the micro-blueprints corresponding to the stack elements is further explained with reference to FIG. 8.

Figure 7:
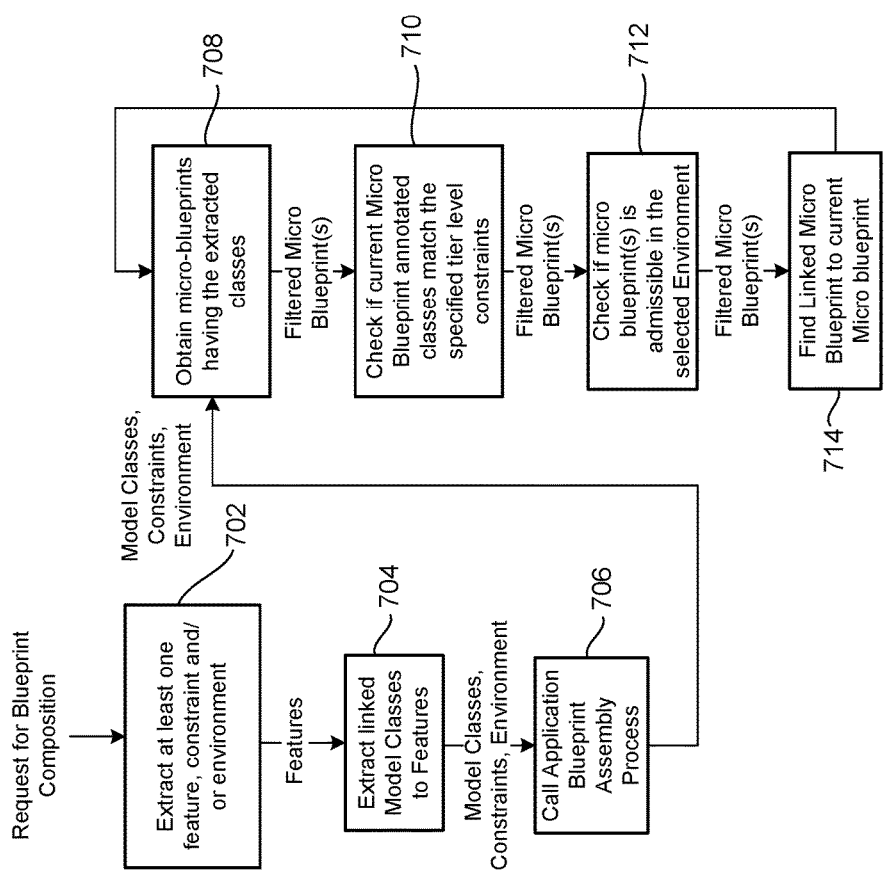
FIG. 7 illustrates a flowchart for the assembly of the micro-blueprints for the plurality of service tiers according to an embodiment.

FIG. 7 illustrates a flowchart for the assembly of the micro-blueprints for the service tiers according to an embodiment. Although FIG. 7 is illustrated as a sequential, ordered listing of operations, it will be appreciated that some or all of the operations may occur in a different order, or in parallel, or iteratively, or may overlap in time.

At least one feature, constraint, and/or environment are extracted from the request (702). For example, the application blueprint assembler 110 may extract at least the feature, which may specify a certain type of application. However, the feature may include any type of feature related to the assembly of application. Further, the request may specify one or more constraints and/or environments.

Linked model classes are extracted from the request (704). For example, the application blueprint assembler 110 may extract the linked model classes from the request. In other words, the features may correspond to one or more of the plurality of classes, and the constraint and/or environment may correspond to one or more of the class properties. As such, the application blueprint assembler 100 may obtain the relevant classes for the features, constraints, and the environment.

The application blueprint assembly process is called (706). For example, the application blueprint assembler 110 may start the application blueprint assembly process, and the application blueprint assembler 115 may start to assemble the micro-blueprints corresponding to the service tiers of the application.

The micro blueprints having the extracted classes are obtained (708). For example, the application blueprint assembler 115 may query the micro-blueprint database 130 in order to obtain the micro-blueprints having the extracted classes. For example, the application blueprint assembler 115 may search the micro-blueprint database 130 in order to obtain a subset of micro-blueprints based on the required capabilities and the available capabilities of the micro-blueprints such that one or more of the available and required capabilities match.

The annotated classes of a current micro blueprint are checked to determine if they match the constraints specified in the request (710). For example, if the request includes one or more constraints, the application blueprint assembler 115 determines if the constraints specified in the request match the class properties of model data 300 corresponding to the current micro-blueprint.

The micro blueprint is checked to determine whether it is admissible in the selected environment (712). For example, the application blueprint assembler 115 may determine if the current micro blueprint is admissible in the environment specified in the request.

The micro-blueprint is obtained (714). For example, if meeting the conditions of 710 and 712, the application blueprint assembler 115 may obtain the micro blueprint from the micro-blueprint database 130. This process may be repeated for each of the micro-blueprints obtained in 708.

The above described process of FIG. 7 may be configured in a set of instructions, which when executed cause one or more processors to perform a series of functions. The instructions may include:

```
// Process to generate complete composed blueprint for application
for all Functional & Non Functional Features in Request {
    for all Model Classes in Features {
        Call function process(Classes, Constraints, Environment)
    }
// Above yields a list of candidate composed complete blueprints with
micro
//blueprints for each of the related tiers or functional components
List<Blueprint> composedBlueprints
for all composedBlueprints {
    for each tier microBlueprint in a composedBlueprint {
        Invoke Process to generate the composed blueprint for the software
        stack of the component
        Add this to the tier microBlueprint
    }
}
}
List<MicroBlueprint> function process(Classes, Constraints,
Environment) {Environment) {
    List<MicroBlueprint> microBlueprints
```

```
for all Classes {
    microBlueprints = Find MicroBlueprint(s) in Repository annotated
with these classes i.e.
    class is subset FunctionalComponent.Capabilities.Functional-
Feature.type
}
for all microBlueprints {
    Check if current MicroBlueprint annotated classes match the
specified tier level constraints (if any)
    if(no) Remove from microBlueprints
}
for all microBlueprints satisfying constraints {
    Check if current MicroBlueprint is admissible in the selected
Environment
        if(no) Remove from microBlueprints
}
for all microBlueprints dynamically discover the linked functional
component micro-blueprints {
    // recursive step
    List<MicroBlueprint> linkedMicroBlueprints =
Call function process (Current.MicroBlueprint.Required
Capabilities.Classes, Constraints, Environment)
    if(linkedMicroBlueprints empty) Remove current from microBlueprints
    else Link linkedMicroBlueprints to current MicroBlueprint
    }
}
return microBlueprints
```

Next, the functional component blueprint assembler 120 is configured to assemble micro blueprints corresponding to software stack element for each of the service tiers. For example, the functional component blueprint assembler 120 is configured to dynamically compose packages/software stack elements to build a software stack for each service tier.

In one embodiment, the functional component blueprint assembler 120 utilizes the needs relation and its specializations or restrictions in the process of building a suitable software stack automatically from micro-blueprints of the individual software elements. This is possible because the needs relation represents dependencies between classes for abstract software elements from a software stack perspective.

Figure 8:
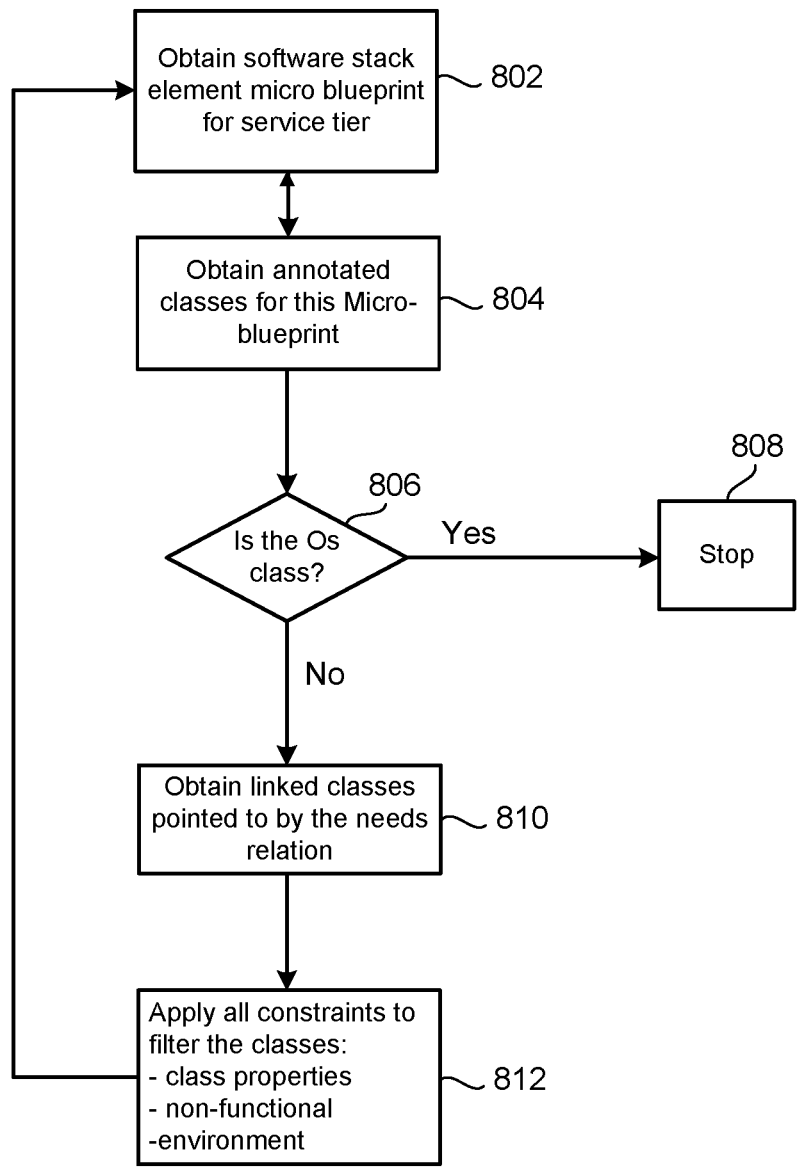
FIG. 8 illustrates a process to assemble micro-blueprints corresponding to the software stack elements according to an embodiment.

FIG. 8 illustrates a process to assemble micro-blueprints corresponding to the software stack elements according to an embodiment. Although FIG. 8 is illustrated as a sequential, ordered listing of operations, it will be appreciated that some or all of the operations may occur in a different order, or in parallel, or iteratively, or may overlap in time.

The micro-blueprints for the software stack elements may be obtained for each service tier (802). For example, the functional component blueprint assembler 120 may be configured to obtain the micro-blueprints for the service tier micro-blueprints obtained in the process of FIG. 7.

The annotated classes for the micro-blueprints are obtained (804). For example, the functional component blueprint assembler 120 may obtain the relevant annotated classes from the obtained micro-blueprints. The process may determine if the current annotated class is the operating system class (806). For example, the functional component blueprint assembler 120 may determine if the current annotated class is the operating system class. If yes, the process is stopped because it signals the end of the software stack element. If no, the process continues to 810. Although this particular example utilizes the operating system software element stack as an ending point, the embodiments encompass using any type of software stack element as the ending point.

The linked classes pointed to by the relational information are obtained (810). For example, the functional component blueprint assembler 120 may obtain the linked classes point to by the needs relation. Each feature, constraint, and environment contained in the request is applied to the classes (812). For example, the functional component blueprint assembler 120 may apply each feature, constraint, and environment contained in the request to the classes. Subsequently, the process may repeat itself for each software stack element in each of the service tiers.

The above described process of FIG. 8 may be configured in a set of instructions, which when executed cause one or more processors to perform a series of functions. The instructions may include:

```
// Process to generate composed blueprint for a tier or functional
component consisting of a suitable software stack
    // automatically from micro-blueprints of the individual
software elements
    - Get app Deployment micro blueprint for Functional Component or
tier e.g. for PetStore App Tier it is the PetStore EAR micro blueprint
    - Get annotated class(es) for the Deployment micro blueprint e.g. for
PetStore EAR it is EAR class from the model
    - Carry on in a recursive manner until you reach the OS class - stop
here as you have the software stack {
        - For annotated class get linked class(es) pointed to by the needs*
relation e.g. for EAR above the needs relation points to J2EEServer class
        - If a more specialized needs* relation is present then one chooses
the linked specific class - otherwise there could be many choices
            for the linked classes
            e.g. Deployment can be linked to any AppServer
        - Apply specified class properties level constraints to filter the
classes to get the matching ones e.g. a constraint like
            J2EEServer.conformanceLevel > 1.5 can filter out .NET app
servers
        - Look at non functional requirements to filter out options that
do notmatch them e.g. if HA is required then instead of
WebLogic Blueprint
            WebLogic clustered Blueprint is chosen
        - Also filter for Environment e.g. Dev, Prod may have different
requirements
    }
```

Also, as explained above, if the number of micro-blueprints is relatively large, the application blueprint assembler 110 may assemble the micro-blueprints using an AI search algorithm.

An AI search is used in a lot of different problems where the search space is very large e.g. in games, robot motion planning. AI search algorithms make it computationally very feasible to solve a range of search like problems. This problem has been formulated as an Artificial Intelligence (AI) search problem where the solution is the fully assembled complete blueprint with both the software stack definitions as well as the tier definitions included.

More specifically, the problem is formulated as an A* (AStar AI Search Algorithm) search problem. Briefly the A* algorithm is heuristic based "best-first" search algorithm which starts from an initial state and takes one to a goal state(s), at any current state choosing the best next state based on the heuristic equation provided below.

$$f(n)=g(n)+h(n) \qquad \text{Eq. (1)}$$

The parameter $g(n)$ is the lowest cost incurred in the chosen path the search algorithm has taken so far to the current state (e.g., the path formed out of the chosen states so far). The cost of a particular path segment is defined in a problem specific manner.

The parameter $h(n)$ is the estimated cost of the remaining path to the goal state(s) from the current state. All of these parameters, the goal state(s), functions and cost can be defined as needed in the problem. In this case, a functional component with a set of capabilities and a set of required capabilities may represent a current state. There may be several functional components in the micro-blueprint database 130 that either individually or in combination satisfy the required capabilities.

For example, in particular example, the "web tier" component forms the current state "State n". The web tier component has required capabilities "Inventory" and "Shopping Cart". Thus, querying the micro-blueprint database 130 may yields three components which either partially or completely satisfy these required capabilities namely "app tier" (completely meets requirements), "inventory service" (partially) and "shopping cart service" (partially). Potential next states are generated (e.g., "State n+1" and State n+2") from these in such a way that each state completely satisfies the current state "State n" requirements. In this case, "State n+1" comprises of the "inventory service" and the "shopping cart service" components and "State n+2" is comprised of the "app tier" component.

Next, the optimum state is chosen amongst these states as the optimum state. This cost can include heuristics like choose state with minimum number of components, also considering the constraints, for example. This also feeds into the cost function g(n). Thus, a path that least cost or best is built.

The goal state is reached by keeping track of accumulated "capabilities" of the chosen states so far and the accumulated "required capabilities". Once the accumulated "required capabilities" are a subset of accumulated "capabilities", the complete blueprint is determined and the process stops searching.

As a result, the data processing apparatus of the embodiments may decompose the blueprint into compose-able and re-usable micro-blueprints, and the micro blueprints are annotated with one or more classes from the model data in the model database 135. Essentially, the annotated micro-blueprints map the micro-blueprints of the service or software stacks to one or more classes of the model data, where the model data also includes relational information defining relations among the classes. Using the annotated micro-blueprints and the model data, the data processing apparatus automatically assembles the complete composed blueprint on the fly from the micro-blueprints so that the application can be provisioned or developed. In other words, the data processing apparatus 100 uses a model driven approach for flexible, dynamic and automated, complete blueprint composition from smaller building blocks such as the micro-blueprints. The complete application blueprint may encompass the functional blueprint or the deployment blueprint described above. This completely assembled blueprint can be used to develop the entire application including its components or tiers, and their respective software stack elements.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art.

What is claimed is:

1. A data processing apparatus for automated blueprint assembly, the data processing apparatus including:
   at least one processor;
   a non-transitory computer-readable medium storing instructions that when executed by the at least one processor are configured to implement:

a micro-blueprint assembler configured to receive a request for automated blueprint assembly for assembling an application, the request specifying at least one feature;

a model database configured to store model data, the model data including a plurality of classes arranged in a hierarchy with relational information specifying relationship links among the plurality of classes;

a micro-blueprint database configured to store a plurality of micro-blueprints, each micro-blueprint corresponding to a functional component, and respectively including service stack elements of at least one member of a web tier, an application tier, and a database tier, each micro-blueprint being annotated with one or more classes of the plurality of classes, the micro-blueprint assembler configured to generate at least one application blueprint for the application by assembling micro-blueprints from the micro-blueprint database, wherein, when generating the at least one application blueprint, the micro-blueprint assembler is configured to:

apply the at least one feature to the classes of the model data of the model database to obtain a class that is relevant to the at least one feature of the request, and query the micro-blueprint database to obtain at least one micro-blueprint having the obtained class and at least one micro-blueprint linked to the obtained class by the relational information.

2. The data processing apparatus of claim 1, wherein the request also specifies at least one constraint and environment.

3. The data processing apparatus of claim 1, wherein the at least one feature is at least one non-functional feature, the at least one non-functional feature specifying a security feature or a scalability feature.

4. The data processing apparatus of claim 1, wherein the plurality of classes of the model data are annotated with class properties, and the plurality of micro-blueprints are annotated with the class properties.

5. The data processing apparatus of claim 1, wherein the plurality of classes include represent components of the application, the components including an operating system, database server, application server, execution environment, and deployment artifacts, the plurality of classes being annotated with abstracted domain knowledge information for the components.

6. The data processing apparatus of claim 1, wherein the micro-blueprint assembler is configured to generate the at least one application blueprint by obtaining a subset of the plurality of micro-blueprints from the micro-blueprint database for each of the web tier, the application tier, and the database tier.

7. The data processing apparatus of claim 1, wherein the micro-blueprint assembler includes:

an application blueprint assembler configured to obtain micro-blueprints from the micro-blueprint database corresponding to each of the web tier, the application tier, and the database tier; and a functional component blueprint assembler configured to obtain micro-blueprints from the micro-blueprint database corresponding to the service stack elements for each of the web tier, the application tier, and the database tier.

8. The data processing apparatus of claim 7, wherein the application blueprint assembler is configured to obtain the micro-blueprints by obtaining micro-blueprints based on a matching of the required and available capabilities of the micro-blueprints.

9. The data processing apparatus of claim 1, wherein the micro-blueprint assembler is configured to obtain the at least one micro-blueprint linked to the obtained class using the relational information of the model data as a guide for determining which micro-blueprint is linked to the obtained class.

10. The data processing apparatus of claim 1, wherein the micro-blueprint assembler is configured to obtain the micro-blueprints using an artificial intelligence (AI) search algorithm.

11. The data processing apparatus of claim 1, wherein the micro-blueprint assembler is configured to generate multiple complete blueprints for the application including a first complete blueprint and a second complete blueprint, the micro-blueprint assembler being configured to provide the first and second complete blueprint according to a level of suitability that achieves the at least one feature of the request.

12. A method for automated blueprint assembly, the method being performed by at least one processor, the method comprising:

receiving a request for automated blueprint assembly for assembling an application, the request specifying at least one feature;

accessing a model database storing model data, the model data including a plurality of classes arranged in a hierarchy with relational information specifying relationship links among the plurality of classes;

accessing a micro-blueprint database configured to store a plurality of micro-blueprints, each micro-blueprint corresponding to a functional component, and respectively including service stack elements of at least one member of a web tier, an application tier, and a database tier, each micro-blueprint being annotated with one or more classes of the plurality of classes; and generating at least one application blueprint for the application by assembling micro-blueprints from the micro-blueprint database, including:

applying the at least one feature to the classes of the model data of the model database to obtain a class that is relevant to the at least one feature of the request, querying the micro-blueprint database to obtain at least one micro-blueprint having the obtained class and at least one micro-blueprint linked to the obtained class by the relational information.

13. The method of claim 12, wherein the plurality of micro-blueprints are re-usable micro-blueprints such that the plurality of micro-blueprints are available for assembling a secondary application.

14. The method of claim 12, wherein the plurality of classes represent different levels of stack elements and the relational information define relations between the plurality of classes.

15. The method of claim 12, wherein the plurality of classes include core abstract classes of the application including an application, deployment, application server, platform runtime, operating system and database server, and each of the core abstract classes have sub-classes corresponding to at least some of the micro-blueprints stored in the micro-blueprint database.

16. The method of claim 12, wherein generating the at least one application blueprint includes:
- assembling first micro-blueprints for the web tier;
- assembling second micro-blueprints for the application tier; and
- assembling third micro-blueprints for database tier, wherein the at least one application blueprint includes the first, second, and third micro-blueprints.

17. The method of claim 12, wherein generating the at least one application blueprint includes:
- assembling the micro-blueprints using the model data as a guide to determine which micro-blueprint is linked to the obtained class.

18. A non-transitory computer-readable medium storing executable instructions that when executed cause at least one processor to:
- receive a request for automated blueprint assembly for assembling an application, the request specifying at least one feature;
- access a model database storing model data, the model data including a plurality of classes arranged in a hierarchy with relational information specifying relationship links among the plurality of classes;
- access a micro-blueprint database configured to store a plurality of micro-blueprints, each micro-blueprint corresponding to a functional component, and respectively including service stack elements of at least one member of a web tier, an application tier, and a database tier, each micro-blueprint being annotated with one or more classes of the plurality of classes; and
- generate at least one application blueprint for the application by assembling micro-blueprints from the micro-blueprint database, including:
  - apply the at least one feature to the classes of the model data of the model database to obtain a class that is relevant to the at least one feature of the request,
  - query the micro-blueprint database to obtain at least one micro-blueprint having the obtained class and at least one micro-blueprint linked to the obtained class by the relational information.

19. The non-transitory computer-readable medium of claim 18, wherein the plurality of micro-blueprints are re-usable micro-blueprints such that the plurality of micro-blueprints are available for assembling a secondary application.

* * * * *